US008281566B2

(12) United States Patent (10) Patent No.: US 8,281,566 B2
Grayson et al. (45) Date of Patent: Oct. 9, 2012

(54) THERMALLY-INTEGRATED FLUID STORAGE AND PRESSURIZATION SYSTEM

(75) Inventors: Gary D. Grayson, Huntington Beach, CA (US); Mark W. Henley, Topanga Canyon, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/965,873

(22) Filed: Dec. 11, 2010

(65) Prior Publication Data

US 2011/0088368 A1    Apr. 21, 2011

Related U.S. Application Data

(62) Division of application No. 11/641,908, filed on Dec. 20, 2006, now Pat. No. 7,900,434.

(51) Int. Cl.
*B64G 1/40* (2006.01)

(52) U.S. Cl. ............. 60/204; 60/257; 60/200.1; 60/259

(58) Field of Classification Search .................. 60/257, 60/259, 266, 200.1, 240, 734, 267, 204; 137/334; 62/47.1, 45.1, 48.1, 48.3, 50.2, 48.4, 49.1
See application file for complete search history.

(56) References Cited

U.S. PATENT DOCUMENTS

| | | | | |
|---|---|---|---|---|
| 3,274,788 A | * | 9/1966 | Hoffman et al. | 62/45.1 |
| 3,782,128 A | * | 1/1974 | Hampton et al. | 62/45.1 |
| 5,063,734 A | * | 11/1991 | Morris | 60/204 |
| 5,226,299 A | * | 7/1993 | Moiseev | 62/45.1 |
| 5,477,690 A | * | 12/1995 | Gram | 62/45.1 |
| 5,901,557 A | | 5/1999 | Grayson | |
| 6,581,882 B2 | * | 6/2003 | Valentian | 244/158.4 |
| 6,584,780 B2 | * | 7/2003 | Hibino et al. | 62/46.1 |
| 2003/0014965 A1 | * | 1/2003 | Hashimoto et al. | 60/259 |

* cited by examiner

*Primary Examiner* — William H Rodriguez
*Assistant Examiner* — Gerald Sung
(74) *Attorney, Agent, or Firm* — Novatech IP Law

(57) ABSTRACT

A propulsion system may be operated by determining pressure in a cryogenic liquid tank storing a fluid and cooling the cryogenic liquid tank in response to determining that the pressure is greater than a predetermined value. The cryogenic liquid tank may be pressurized by admitting a gaseous form of the fluid into the cryogenic liquid tank in response to determining that the pressure in the cryogenic liquid tank is less than a predetermined value.

18 Claims, 6 Drawing Sheets

| Component Legend | |
|---|---|
| ⊗ | Pneumatic Valve (PV) |
| ▶◀ | Solenoid Valve (SV) |
| ▶⟋◀ | Latching Valve (LV) |
| ⊟ | Check Valve (CV) |
| ⊟ (RV) | Relief Valve (RV) |
| ▶⊣ | Pressure Regulator (RG) |
| ⌒ | Burst Disk (BD) |
| ☆ | Pyrotechnic Valve (XV) |
| ▯ | Sealing Disconnect (DC) |
| ⊠⊢ | Manual Disconnect (MV) |
| ⊔ | Manual Valve Cap (MC) |
| ▯ | Orifice (OR) |
| ▷ | Vent Diffuser (VD) |
| ▨ | Filter (FL) |
| ▯ | Pressurant Diffuser (DF) |
| ▨ | Catalyst Bed (CB) |
| ⊲⊐ | Primary RCS Engine (PR) |
| ⊂⊐ | Vernier RCS Engine (VR) |
| ⊙ | TVS Mixer Pump (MP) |
| ⊔ | Vent Baffle (VB) |
| — | Slosh Baffle (BF) |
| ⟋• | Thermal Switch (TS) |
| ⌇ | Electric Heater (ET) |
| ▭ | Cryocooler (CC) |

FIG. 1D

THERMALLY-INTEGRATED FLUID STORAGE AND PRESSURIZATION SYSTEM

CROSS-REFERENCE TO RELATED APPLICATIONS

The present application is a divisional of and claims priority to pending application Ser. No. 11/641,908 entitled THERMALLY-INTEGRATED FLUID STORAGE AND PRESSURIZATION SYSTEM filed on Dec. 20, 2006, the entire contents of which is incorporated by reference herein.

STATEMENT RE

Federally Sponsored Research/Development

This invention was made with Government support under Contract No. NNM05AA97C awarded by the National Aeronautics and Space Administration. The Government has certain rights in this invention.

FIELD

The disclosure relates generally to fluid storage and/or pressurization systems. More particularly, the disclosure relates a fluid storage and/or pressurization system for regulating temperature and/or pressure of the system in a controlled manner and the method of operation thereof.

BACKGROUND

Liquid hydrogen and liquid oxygen are amongst the most common propellants for space vehicles. Hydrogen and oxygen yield substantial amounts of energy per pound of propellant when combined.

These elements have an additional advantage of being extremely clean and safe propellants that when combined produce water. In addition to its use as a propellant, the liquid oxygen can be utilized in additional roles, such as in maintaining breathable atmospheric conditions within space vehicles, power generation from fuel cells. Oxygen and hydrogen also have the added benefit of being found in water, which may be found in sufficient quantities on the moon or on Mars in the from of ice, providing an indigenous propellant to be used to recharge the vehicle for return flights. By comparison, earth storable propellants, for instance combinations of hydrazine and dinitrogen tetroxide, are hypergolic and have significant toxicity, thus limiting their use to the role of propellants only. Similarly, existing $N_2O_4$, MMH, $N_2H_4$, hydrocarbons heavier than $CH_4$, helium gas, and nitrogen propellants can not be made easily if at all from the indigenous materials on the moon or Mars.

The indigenous availability of the propellant is important because if the space vehicle is undertake longer manned flights, like those proposed to be taken to the moon and Mars, it is anticipated that there will be a need to fill the tanks of the vehicle with these propellants in their liquid form in space and fill them with materials that can be obtained at the landing sites. To accomplish this, the propellants, in their constituent form, should be liquid for ease of transfer and storage. To be a liquid, hydrogen and oxygen must be cooled to be put in a cryogenic state.

However, in low gravity, surface tension causes most liquids to adhere to and wrap around the tank wall instead of collecting at the tank "bottom." This tendency also causes difficulties in transferring propellant, as opposed to "filling" the tank the inflowing liquid tends to cling to the sides of the tank. This also makes it hard to determine how much propellant is in a tank. Pressurizing the tank assists in filling the tank and is necessary for operating the propulsion and reaction control systems of the space vehicle. Similarly, pressurization can be utilized to transfer liquid propellants between tanks in refilling operations.

A pressurization system is commonly used in existing space vehicles to maintain the propellant tanks within preselected pressure ranges for proper main engine operation. Many propulsion systems use a separate gaseous helium system or similar separate gas system for pressurization of propellants. For example the current in-space propellants of the Space Shuttle are dinitrogen tetroxide ($N_2O_4$) and monomethylhydrazine (MMH) using a helium pressurization system. Such a system, however, is impractical for long duration space flights, such as those to the moon or Mars. The large amounts of helium needed for pressurization of such a propellant system as well as the propellants themselves are not readily available on the moon or Mars. Thus, an alternative approach to separate helium pressurization systems and other pressurization gas systems may be beneficial for spacecraft that are to be recharged at the moon or Mars.

Additionally, for these previously known pressurization options, the return propellant is typically carried from Earth thus leading to a much larger and costly vehicle. Additional oxygen and hydrogen for use with the main propulsion system might be made on the moon and Mars from water ice as well. Pressurization gases for the liquid oxygen and liquid hydrogen main propulsion tanks could generate and use the gaseous forms of the propellant, gaseous oxygen and gaseous hydrogen respectively, to pressurize and operate the space vehicle in an autogeneous system.

Thus there are significant advantages to autogenously generated pressurization gasses that are capable of being found indigenously in sufficient quantities at landing sites. Unfortunately, the transport volumes of sufficient gaseous oxygen and gaseous hydrogen is problematic in a lengthy flight space, thus the bulk of the oxygen and hydrogen will be in the cryogenically cooled liquid form. However, tank pressurization in low gravity is not straight forward. In particular, incoming pressurant gases tend to condense into the respective liquids when flowed into the cryogenic cooled liquid tanks. The low-gravity coast of the spacecraft without acceleration tends to cause the liquid propellants to coat the tank walls and generally float about the tank due to surface tension. This can lead to rapid cooling of the incoming gases and condensation of the gasses into liquids. Thus, it is difficult to predict the gaseous oxygen and gaseous hydrogen masses needed to maintain pressure in the propellant tanks due to uncertainties in the amount of condensation in the dynamic low-gravity environments.

These environments are potentially subject to a wide variety of variables, including but not limited to variable external heating, rapid cooling, gravitational interference from orbiting bodies. Due to this wide potential variability in required mass, the conventional use of engine heat to provide gaseous pressurant may be insufficient. An autogeneous system for generating pressurant gases for propulsion would need to overcome these complexities by providing a robust and active pressure management system within the propulsion system. Such a system would need to provide for rapid cooling and heating of components and actively manage tank pressures in a dynamic low-gravity environment.

Similar problems may exist in low-gravity propellant transfer situations, especially in storing the propellant, heating can cause liquid propellants in a storage tank to boil, increasing pressures. To keep the propellant liquid, one must carefully control the heat leak into the liquid and/or remove the heat by cooling. A system to keep heat from reaching the tank or to refrigerate the propellants so that they do not need to be vented to prevent pressure buildup may be preferable. Thus, any such system should be capable of being utilized on spacecraft as well as space stations.

Accordingly, it is desirable to provide a propulsion system for spacecraft that operates on or in the vicinity of the Earth's moon and Mars or where water ice is expected to exist that can provide the oxygen and hydrogen to recharge the vehicle for reuse and return, at least to some extent.

SUMMARY

The foregoing needs are met, to a great extent, by embodiments disclosed herein, wherein in some embodiments a thermally integrated pressurization system and method is provided.

An embodiment of the disclosure relates to an oxygen-hydrogen space vehicle propulsion system. The system includes a cryogenic liquid oxygen tank, cryogenic liquid hydrogen tank, thermal switches, supercritical oxygen bottle(s), supercritical hydrogen bottle(s), pressure management system and, a thermodynamic vent system. The thermal switch permits heat to flow between hot and cool areas within the space vehicle to help facilitate pressure management within the cryogenic liquid oxygen tank and the cryogenic liquid hydrogen tanks in conjunction with the higher pressure supercritical fluid from the supercritical oxygen bottle and the gas from the supercritical hydrogen bottle and the added cooling from the pressure management system.

Another embodiment of the disclosure pertains to a method for operating an oxygen-hydrogen space vehicle system. In the method, pressure is sensed and the sensed pressure is compared to predetermined pressures for at least one of a cryogenic liquid oxygen tank and cryogenic liquid hydrogen. Cryogenic liquid oxygen and hydrogen are cooled if the detecting step indicates an excess pressure condition exists or a cryogenic liquid oxygen tank and a cryogenic liquid hydrogen tank are pressurized via admission of gaseous hydrogen or gaseous oxygen if the determining step indicates low pressure. It is determined if an operating condition of the space vehicle and whether a main propulsion system burn is being conducted. The pressure is detected in the cryogenic liquid oxygen tank and the cryogenic liquid hydrogen tank. The main propulsion system is powered if the detecting step detects sufficient pressure. The pressure is increased in the cryogenic liquid oxygen tank and the cryogenic liquid hydrogen tank if the detecting step detects insufficient pressure.

Cryogenic liquid oxygen or cryogenic liquid hydrogen is respectively transferred to the supercritical oxygen bottle or the supercritical hydrogen bottle in response to it being determined that the main propulsion system burn is being conducted. The fill level or fill fraction of at least one of a supercritical oxygen bottle and a supercritical hydrogen bottle is determined if the determining step determines the space vehicle main propulsion system is not being burned. The supercritical oxygen bottle or a supercritical hydrogen bottle is switched offline. The supercritical oxygen bottle or the supercritical hydrogen bottle is cooled. The pressure in the supercritical oxygen bottle or the supercritical hydrogen bottle is reduced. The cryogenic liquid oxygen or cryogenic liquid hydrogen is transferred to the supercritical oxygen bottle or the supercritical hydrogen bottle. The supercritical oxygen bottle or the supercritical hydrogen bottle is warmed.

Another embodiment of the disclosure relates to a system for thermally and/or pneumatically regulating a fluid storage system. The system includes a tank, supercritical bottle, thermal switch, and pressure management system. The tank stores a fluid. The supercritical bottle stores the fluid at supercritical conditions. The thermal switch selectively thermally couples and thermally uncouples the tank and the supercritical bottle. The pressure management system controls the thermal switch. The pressure management controls the thermal switch to thermally couple the tank and the supercritical bottle in response to a tank pressure exceeding a predetermined maximum tank pressure.

In a further embodiment, disclosed is a method of operating a propulsion system comprising the steps of determining pressure in a cryogenic liquid tank storing a fluid and cooling the cryogenic liquid tank in response to determining that the pressure is greater than a predetermined value. The method may further include pressurizing the cryogenic liquid tank via admission of a gaseous form of the fluid in response to determining that the pressure is less than a predetermined value.

Additionally disclosed is an embodiment of a methodology of regulating a fluid storage system. The methodology may include the steps of storing liquid hydrogen in a liquid hydrogen tank, storing gaseous oxygen in a supercritical oxygen bottle and thermally coupling the liquid hydrogen tank to the supercritical oxygen bottle. The method may further include regulating heat flow between the liquid hydrogen tank and the supercritical oxygen bottle in response to the thermal coupling.

The present disclosure also includes a method of operating a fluid storage system comprising the steps of storing liquid hydrogen in a liquid hydrogen tank and storing liquid oxygen in a liquid oxygen tank. The method may further include storing gaseous hydrogen in a supercritical hydrogen bottle and storing gaseous oxygen in a supercritical oxygen bottle. The method may include activating a plurality of thermal switches coupling the liquid hydrogen tank to each one of the liquid oxygen tank, the supercritical hydrogen bottle, and the supercritical oxygen bottle. Each one of the thermal switches may regulate heat flow between the liquid hydrogen tank and each one of the liquid oxygen tank, the supercritical hydrogen bottle, and the supercritical oxygen bottle in response to activating the thermal switches.

There has thus been outlined, rather broadly, certain embodiments in order that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that embodiments are not limited in its application to the details of construction and to the arrangements of the components set forth in the following description or illustrated in the drawings. Other embodiments in addition to those described herein are capable of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of various embodiments. It is important, therefore, that the claims be regarded as including such equivalent constructions insofar as they do not depart from the spirit and scope of the embodiments.

BRIEF DESCRIPTION OF THE DRAWINGS

FIG. 1D is a legend of symbols corresponding to the symbols in the schematic illustrated in FIGS. 1A-1C.

DETAILED DESCRIPTION

Figure 1A:
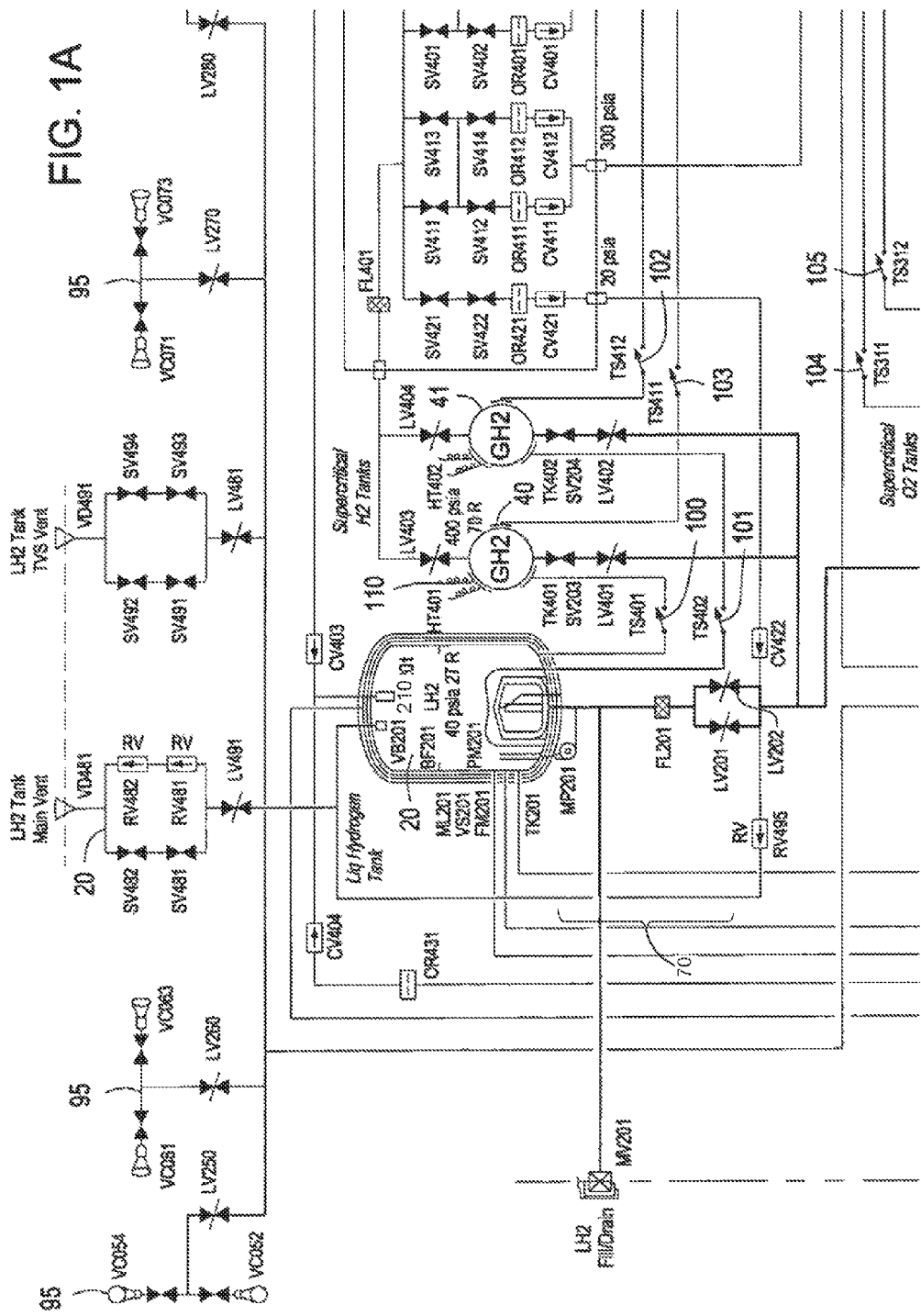
FIGS. 1A-1C illustrate a schematic diagram of a propulsion system according to an embodiment.

Embodiments will now be described with reference to the drawing figures, in which like reference numerals refer to like parts throughout. An embodiment disclosed herein provides an apparatus that includes a cryogenic oxygen tank and a cryogenic hydrogen tank for containing the liquid forms of the constituent propellants. Supercritical oxygen bottles and supercritical hydrogen bottles are provided to be charged with pressurized supercritical fluid forms of the propellant. Some or all of these may be coupled to thermal switches that conduct heat, as needed, for cooling and heating the tanks and supercritical bottles. The thermal switch permits heat to flow between hot and cool areas within the space vehicle to help facilitate pressure management and the added from the pressure management system also helps to regulate the pressure in the tanks.

It is an advantage of various embodiments that a system of maintaining a hydrogen-oxygen propulsion system provides autogenous generation of gas for pressurization and/or for powering a reaction control system through thermal switches and a pressure management system that includes a pressure management device to provide additional cooling and assists in maintaining the pressurization within any suitable propulsion system. The system provides cooling of cryogenic liquid tanks, cooling of the supercritical bottles for refilling, heating of the supercritical bottles to maintain supercritical conditions, cooling of the liquid tanks to minimize boil-off and manage pressure variations, and heating of the liquid oxygen supercritical bottles from engine heat to generate additional gaseous oxygen for pressurization.

An example of an apparatus and method is illustrated in FIGS. 1A-1D. In the embodiment of FIGS. 1A-1D, a propulsion system is shown having a cryogenic liquid oxygen tank 10 (FIG. 1B) and cryogenic liquid hydrogen tank 20 (FIG. 1A). The number of tanks used to provide the functionality may vary, as with many of the components described herein, and one or more of the various embodiments contemplates the use of single or multiple tanks for each gas species. A supercritical oxygen bottle 30 (FIG. 1B) and a supercritical hydrogen bottle 40 (FIG. 1A) are provided. In this embodiment, two supercritical oxygen bottles 30 and 31 (FIG. 1B) and two supercritical hydrogen bottles 40 and 41 (FIG. 1A) are used, which allows one to be filled while the other is in use and valves are included to operate in this way. As with the tanks and a wide number of components of the disclosed propulsion system, single bottles or multiple bottles may be included without departing from the spirit of the various embodiments.

Figure 1B:
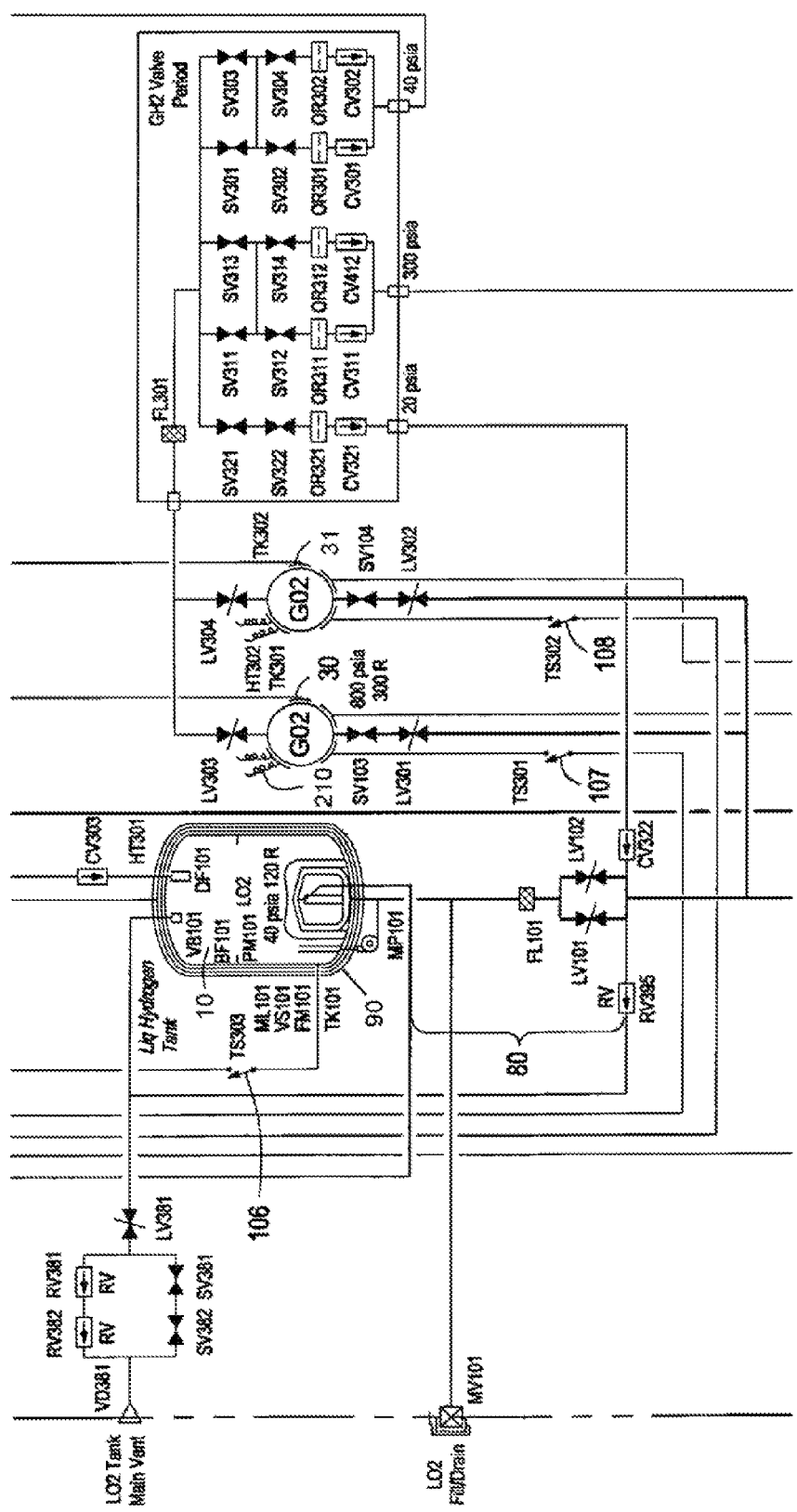
Figure 1C:
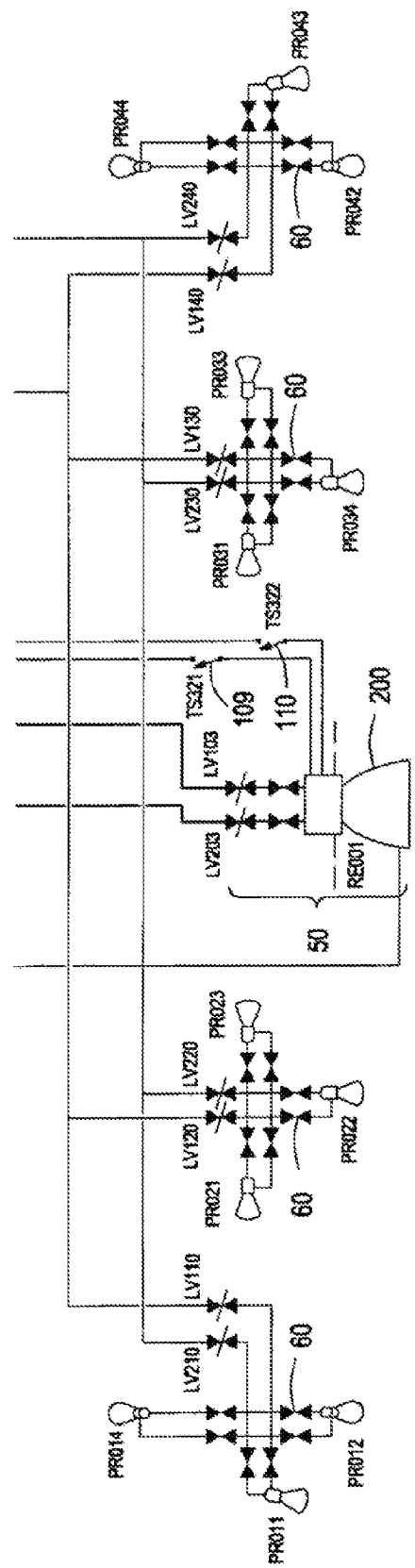

As shown in FIG. 1C, A main engine 200 is provided as part of a Main Propulsion System (MPS) 50 and is coupled to the cryogenic liquid oxygen tank 10 and the cryogenic liquid hydrogen tank 20. Similarly, a Reaction Control System (RCS) 60 is provided with thrusters that operate on gaseous oxygen and gaseous hydrogen, the exact number and type of engines and thrusters within the MPS 50 and RCS 60 may be varied without departing from the spirit of the various embodiments. The two supercritical oxygen bottles 30 and 31 (FIG. 1B) and two supercritical hydrogen bottles 40 and 41 (FIG. 1A) provide the gaseous oxygen and gaseous hydrogen, respectively, for both the RCS 60 and pressurization of onboard systems and can include connections to both sets of bottles.

The cryogenic liquid oxygen tank 10 and cryogenic liquid hydrogen tank 20 and two supercritical oxygen bottles 30 and 31 and the two supercritical hydrogen bottles 40 and 41 are filled, on Earth for example, before launch, thus initially MPS 50 propellant (cryogenic liquids), RCS 40 propellants (gaseous propellants stored supercritically), and liquid cryogen tank pressurants (also gaseous propellants stored supercritically) are all on board and ready for use.

During the course of the mission, the cryogenic propellant tanks 10 and 20 may absorb heat which in turn tends to boil some of the cryogenic liquids. This absorbed heat may result in a corresponding pressure rise. To avoid exceeding the maximum recommended pressure for the tank, the temperature and/or pressure may be reduced. Merely opening a vent in low gravity will likely flow out liquid along with gases which unnecessarily wastes precious higher density liquid propellant.

To decrease tank pressures without significant fluid loss, a pressure management system is provided. The pressure management system includes a hydrogen propellant management device (PMD) 70 as shown in FIG. 1A. The PMD 70 includes any suitable propellant management device or system. An example of a suitable propellant management device is described in U.S. Pat. No. 5,901,557, which is hereby incorporated by reference, and may be utilized in conjunction with the cryogenic liquid hydrogen tank 20. The liquid hydrogen PMD 70 provides liquid hydrogen acquisition in the low-gravity environment as well as tank pressure control through its passive thermodynamic vent system (TVS). Here, some small amount of hydrogen is removed from the cryogenic liquid hydrogen tank 20 and the pressure may be reduced, which decreases the temperature of the flowing fluid hydrogen removed from the tank. This fluid is colder than the surrounding bulk liquid hydrogen and thus as the cooler fluid flows through a heat exchanger integral with the liquid hydrogen PMD 70, the bulk liquid hydrogen temperature decreases which brings the tank pressure down as well. Thus, some small amount of fluid is removed to cool the tank and avoid the venting of large amounts of fluid. The pressure management system may also include a liquid oxygen tank PMD 80 as shown in FIG. 1B, which can also use the design of U.S. Pat. No. 5,901,557. However, the TVS would be removed in the embodiment as shown and the $LO_2$ tank is cooled with the $LH_2$ tank TVS fluid. Thus, the liquid oxygen PMD 80 provides for liquid oxygen acquisition as described in U.S. Pat. No. 5,901,557.

Once the fluid that is vented in the TVS exits the liquid hydrogen PMD 70, in the embodiments shown, it flows through a series of tubes coupled to at least one high-conductivity thermal shield 90, for example, vapor cooled shields (VCSs) as shown, that surround both the liquid cryogenic liquid hydrogen tank 20 and the cryogenic liquid oxygen tank 10. The TVS fluid in the embodiment shown first cools the cryogenic liquid hydrogen tank 20, because it is much colder than the cryogenic liquid oxygen tank 10, and in series the TVS fluid goes on to cool the liquid oxygen tank 10 through a similar at least one high conductivity thermal shield 90.

After flowing around the cryogenic liquid oxygen tank 10 through at least one high conductivity thermal shield 90, the warmed hydrogen flows to a manifold that feeds a series of thrusters 95 that operate on hydrogen only. Each thruster 95 can be for example, but is certainly not limited to, a simple non-burning gas thruster or a resistojet type which adds electrically generated heat to improve thruster performance. Thus, for the liquid generated by the TVS through the PMDs 70 and 80, the embodiment provides for all of the following: added cooling of the cryogenic liquid hydrogen tank 20; pressure control via the propellant management devices 70 and 80; additional cooling of the cryogenic liquid hydrogen tank 20 via the circulation of vented liquids through the at least one high conductivity thermal shield 90; the VCSs in this instance; similar cooling of the cryogenic liquid oxygen tank 10 via the VCS fluid as described and added reaction control thrusting through the series of thrusters 95. Through the use of the PMD 70 and 80 with the VCS as part of a pressure management system, the fluids are being more efficiently used for additional cooling and pressure control instead of simply being vented.

Throughout the mission, the contents of the cryogenic liquid oxygen tank 10, cryogenic liquid hydrogen 20, supercritical oxygen bottles 30 and 31, and supercritical hydrogen bottles 40 and 41 are utilized. For example, during a firing of the main engine, cryogenic liquid oxygen and cryogenic liquid hydrogen, from the respective tanks, are fed under pressure to the MPS 50 to be utilized by engine 200. The engine 200 is, for example, but certainly not limited to an expander type engine with a regeneratively cooled nozzle that is cooled by the liquid hydrogen.

Pressurization may be performed via a controlled method by the pressure management system to allow controlled pressurization of the cryogenic liquid hydrogen and cryogenic liquid oxygen tanks in conjunction with the cooling and heating process as described herein. At least one thermal switch 100, shown as eleven thermal switches 100-110 in the embodiment of FIGS. 1A-1D and FIG. 2, is used to alter the temperature of various components by transferring heat between cool and hot components in a controlled manner. This facilitates management of the pressures within some of the components, which can include but certainly are not limited to, the cryogenic liquid oxygen tank 10, the cryogenic liquid hydrogen tank 20, the supercritical oxygen bottles 30 and 31, and the supercritical hydrogen bottles 40 and 41. The at least one thermal switch 100 does this by altering its heat transfer resistance on command, thus allowing for quick changes in the transfer of heat to a component or away from a component.

In the embodiment shown, each supercritical bottle may be operatively coupled to at least one thermal switch 100, in this instance a series of thermal switches 100-111, that allow heat to be moved in or out of the supercritical bottles 30, 31, 40, and 41. A thermal switch is defined as a device that can on command vary the heat transfer resistance between two objects from a low value to a high value. The supercritical oxygen bottles 30 and 31 and the supercritical hydrogen bottles 40 and 41 are cooled via thermal switches 100, 101, 107, and 108, coupled to the cryogenic liquid hydrogen tank 20.

To warm the respective supercritical oxygen bottles 30 and 31 and the supercritical hydrogen bottles 40 and 41, thermal switches 100-111 may be attached to warm spacecraft structure 85. Some spacecraft components such as avionics must be cooled and so the switches that warm the sets of the supercritical oxygen and hydrogen bottles may potentially reduce avionics cooling requirements from other sources such as radiators by coupling with the avionics or the radiators cooling the avionics. Additional warming capabilities may be included for each of the supercritical oxygen bottles 30 and 31 and each of the supercritical hydrogen bottles 40 and 41 via electric heaters 210. However, it is intended that the heaters 210 be limited in use due to the power consumption. The heaters 210 are optionally included for an added margin safety and mission flexibility. Additional thermal switches 109-110 couple the supercritical oxygen bottles 30, 31 to the main engine 200 in order to generate supplemental gaseous oxygen for liquid oxygen tank pressurization. The switch 106 connects the cryogenic liquid oxygen tank 10 to the cryogenic liquid hydrogen tank 20 and provides additional cryogenic liquid oxygen tank 10 cooling over and above what the PMDs 70 and 80 provide through the at least one highly conductive thermal shield 90.

Additionally, gaseous hydrogen is autogenously generated by the engine 200 to provide some of the pressurization of the cryogenic liquid hydrogen tank 20. However, due to the aforementioned issues with condensation of the pressurant gases, some additional gaseous hydrogen is made available from the supercritical hydrogen bottles 40 and 41 to supplement the autogenous pressurization from the engine 200. For the cryogenic liquid oxygen tank 10 pressurization, a gaseous oxygen heat exchanger is included with the engine 200. If a shortfall occurs in the pressurization of the cryogenic liquid oxygen tank 10, gaseous oxygen from the supercritical oxygen bottle 30 provides the additional pressurant mass needed. To enhance the ability to create gaseous oxygen for pressurization, thermal switches 109, 110 are included from the supercritical oxygen bottles 30 and 31 directly to the engine 200 as a heat source. This provides additional energy for gaseous oxygen generation that may be able to replace or supplement the gaseous oxygen heat exchanger included with the engine 200.

A series of pipes, valves, filters, and orifices are used to direct fluids within the propulsion system to where they are needed, as shown in FIGS. 1A-1D. Other hardware components, some not being shown, can include pressure sensors, temperature sensors, mixer pumps such as mixer pumps MP101 and MP201, multilayer insulation such as ML101 and ML201, foam insulation such as FM101 and FM201, vapor cooled shields such as VS101 and VS201, additional PMDs, additional TVSs, structural attachments to hold the tanks, plumbing, engines, and ancillary hardware that can be coupled in the manner suggested by the embodiment shown without departing from the spirit of any other suitable embodiment. The hybrid, autogenous pressurization approach disclosed herein alleviates much of the concern relating to ullage collapse or condensation in a low-gravity environment without having to use a noncondensable pressurant such as helium. It allows for use and maintenance of the propulsion system in conditions that would provide for harvesting indigenous water for use in creating oxygen and hydrogen and then supply a mechanism for pressurizing and recharging the system. Additionally, it provides a more efficient use of PMD vented materials so as to provide additional pressure regulation within a pressure management system.

Figure 2:
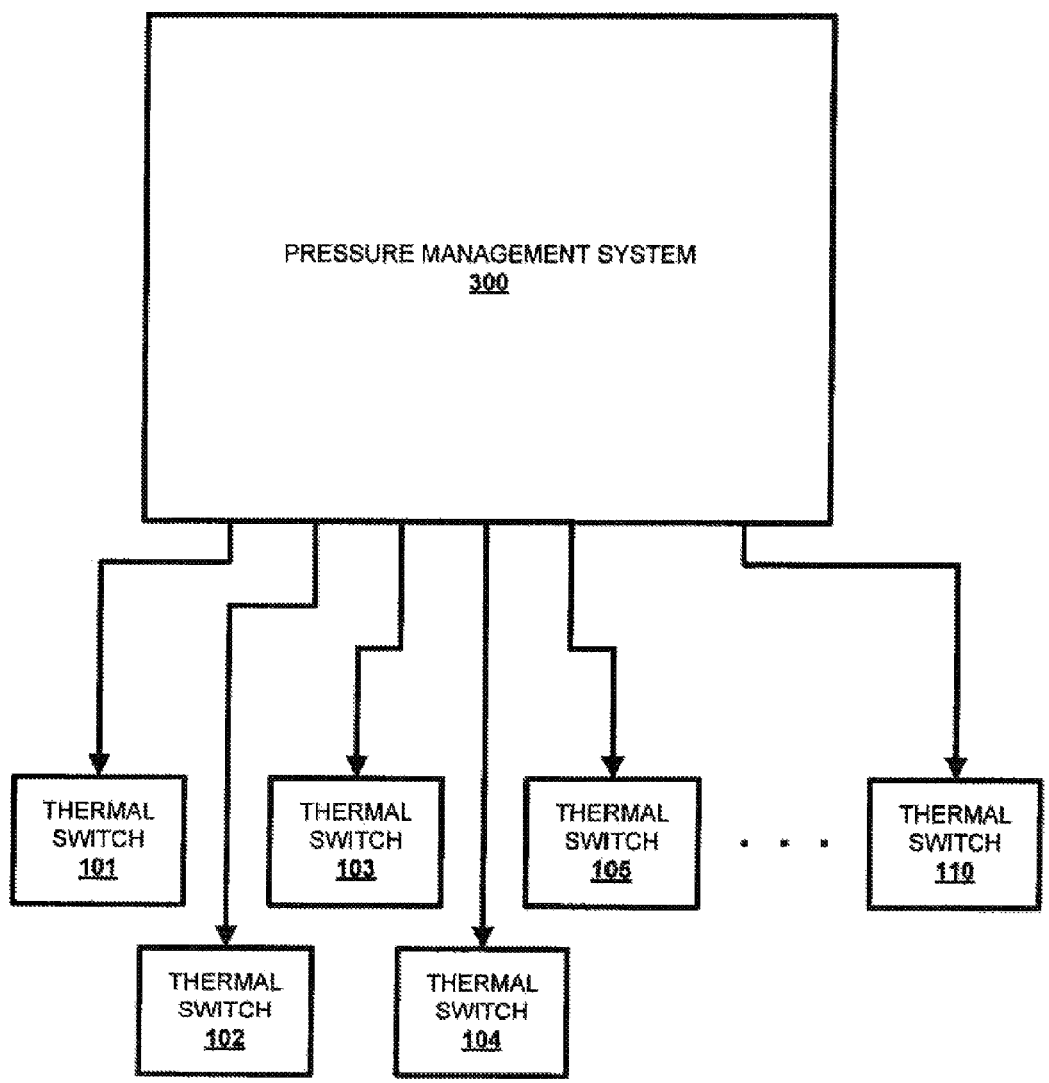
FIG. 2 is plan view of an embodiment of a thermal circuit used in an embodiment.

FIG. 2 shows a thermal circuit suitable for use with the propulsion system illustrated in FIGS. 1A-1D. More generally, the thermal circuit shown in FIG. 2 may be utilized to efficiently regulate the temperature and/or pressure of any suitable cryogenic fluid storage and/or propulsion system. Examples of suitable cryogenic fluid storage and/or propulsion system include: 1) rocket propulsion systems such as the rocket propulsion system illustrated in FIGS. 1A-1D; 2) terrestrial, space-based, and moon or other planet-based propellant storage depots; 3) automotive fuel storage and/or propulsion systems; 4) aircraft fuel storage and/or propulsion systems; and the like. In various embodiments, the cryogenic fluid storage and/or propulsion systems may be configured to contain and/or dispense any suitable propellant, fuel, and/or cryogenic fluid. Particular examples of suitable cryogenic fluids include hydrogen ($LH_2$), oxygen ($LO_2$), methane ($LCH_4$), etc. Of note, although two component propulsion systems, such as $LH_2$ and $LO_2$, are described herein, other embodiments are suitable for use with one component storage/propulsion systems such as hydrogen-hydrogen and methane. In addition, it is within the scope and spirit of various embodiments that multi-component storage/propulsion systems may be thermally and/or pneumatically regulated in a manner similar to the methods described herein.

As shown in FIG. 2, the thermal circuit includes a pressure management system 300 that controls a number of thermal switches 100-110. The thermal switches 100-110 may be used to transfer heat based on the operative condition of the cryogenic fluid storage and/or propulsion system. A thermal switch is defined as a device that may, on command, vary the heat transfer resistance between two objects from a low value to a high value or vice versa. Non-limiting examples of thermal switches include a solenoid with a highly thermally conductive metal element coupling the heat source to the heat sink, a tube charged and/or emptied with a highly thermally conductive gas or liquid to transfer heat through the tube between the heat source and heat sink, a series of parallel highly thermally conductive plates that can be interleaved to facilitate radiant transfer of heat between the heat source and the heat sink, and similar devices capable of varying the heat transfer resistance between two objects on command.

Referring back to FIGS. 1A-1D, a first coupling of a cryogenic liquid hydrogen tank 20 to a supercritical hydrogen bottle 40, shown as a pair of supercritical hydrogen bottles, is provided for cooling a supercritical bottle through the thermal switch 100. The cryogenic liquid hydrogen tank 20 is coupled to a second supercritical hydrogen bottle 41 for cooling the supercritical bottle through thermal switch 101. The cryogenic liquid hydrogen tank 20 is coupled to a supercritical oxygen bottle 30 through thermal switch 107 for cooling. The second oxygen supercritical bottle 31 shown in the embodiment of FIG. 2 is also coupled to the cryogenic liquid hydrogen tank 20 through thermal switch 108. For warming and increasing the pressure in the supercritical bottles, the first supercritical hydrogen bottle 40 is coupled to a warm spacecraft structure 85 through thermal switch 102 and a second supercritical hydrogen bottle 41 is also coupled to a warm structure 85 through thermal switch 103.

Although a single warm spacecraft structure 85 is shown in FIGS. 1A-1D, multiple systems and structures can be utilized to heat or otherwise transfer thermal energy through at least one thermal switch. Similarly, the first supercritical oxygen bottle 30 and the second supercritical oxygen bottle 31 are coupled to warm structure 85 through thermal switches 104 and 105. The first supercritical oxygen bottle and second supercritical oxygen bottle 30 and 31 are also coupled to the main engine 200 to supplement heating and pressurization through thermal switches 109 and 110. Finally, the cryogenic liquid oxygen tank 10 is coupled to cryogenic liquid hydrogen tank 20 through thermal switch 106 for additional cooling. All the switches are in communication and controlled by the pressure management system 300 shown in FIG. 2. The pressure management system 300 monitors the operative state of the propulsion system and has sensors (not shown) to monitor the pressures, temperatures, and similar variables for each of the constituent tanks, bottles, and system components.

Figure 3:
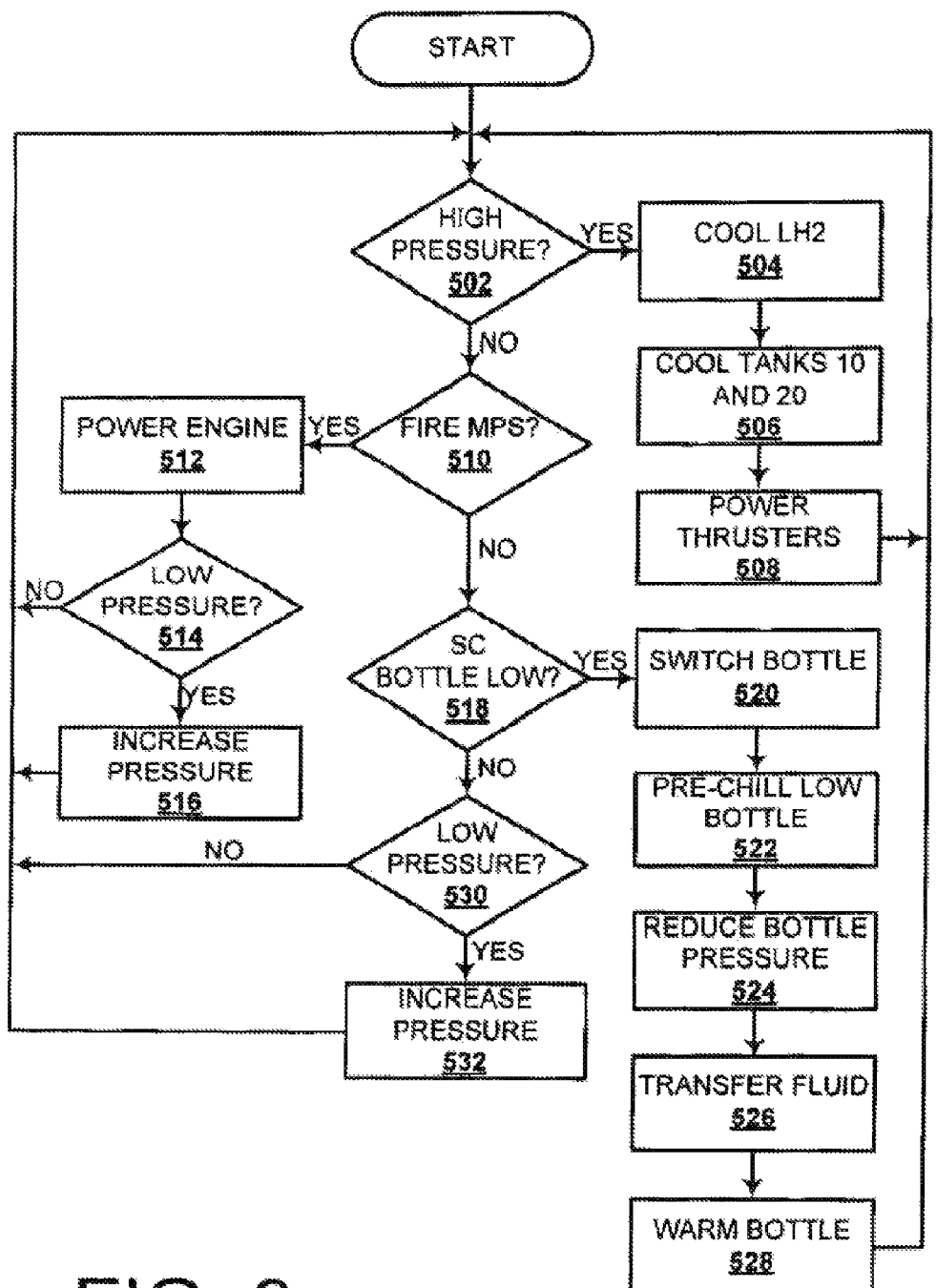
FIG. 3 is a flow chart for a method of an embodiment.

FIG. 3 is a flow diagram of a method 500 for operating a spacecraft propulsion system according to an embodiment. Prior to initiation of the method 500 the spacecraft propulsion system is designed, built, and tested and installed in a spacecraft. The propulsion system is loaded with propellant and the spacecraft prepared for lift off. More particularly, the cryogenic liquid tanks 10 and 20 and the supercritical bottles 30 and 40 that feed the MPS and RCS and pressurize the system may be filled on Earth before launch, thus initially MPS propellant (cryogenic liquids), RCS propellants (gaseous propellants stored supercritically), and liquid cryogen tank pressurants (also gaseous propellants stored supercritically) are all on board and ready for use.

At step 502, it is determined if pressure in the cryogenic liquid tanks 10 and 20 is greater than a predetermined high-pressure value. During the course of the mission, the cryogenic liquid tanks 10 and 20 may absorb heat which in turn tends to boil some of the cryogenic liquids. The resulting pressure rise may be sensed and steps taken to decrease the pressure before reaching the tanks maximum pressure. For example, a pressure sensor in one or more of the cryogenic liquid tanks 10 and 20 may sense the pressure therein and this sensed pressure may be compared to the predetermined high-pressure or low-pressure values. The predetermined high-pressure or low pressure values may be based on one or more factors such as, for example, designed maximum tank pressure, empirical data, manufacturer's recommendations, and the like. In response to the sensed pressure being at or greater than the predetermined high-pressure value, the pressure may be reduced at steps 504-508.

At step 504, a portion of cryogenic liquid hydrogen is removed from the cryogenic liquid hydrogen tank 20 and throttled to a lower pressure thereby also decreasing its temperature. Merely, opening a vent in low gravity will likely flow out liquid along with gases, which unnecessarily wastes precious, higher density liquid propellant. To decrease tank pressure without significant fluid loss at least one propellant management device (PMD) 70, for example but certainly not limited to the PMD described in U.S. Pat. No. 5,901,557, is used in conjunction with the cryogenic liquid hydrogen tank 20. The PMD 70 provides cryogenic liquid hydrogen liquid acquisition in the low-gravity environment as well as tank pressure control through its passive TVS. Here, some small amount of hydrogen is removed from the cryogenic liquid hydrogen tank 20, to decrease the temperature of the portion of cryogenic liquid hydrogen, the pressure of the cryogenic liquid hydrogen is decreased which also decreases the temperature of the flowing fluid. The removed cryogenic liquid hydrogen fluid is colder than the surrounding bulk cryogenic liquid hydrogen and thus as the cooler fluid flows through a heat exchanger integral with the cryogenic liquid hydrogen PMD 70, the bulk cryogenic liquid hydrogen temperature decreases which brings the tank pressure down in tank 20, as well. Thus, some small amount of fluid is removed to cool the tank 20 and avoid venting of large amounts of fluid.

At step 506, the tanks 10 and 20 are cooled by the portion of removed cryogenic liquid hydrogen. Once the portion of removed cryogenic liquid hydrogen exits the cryogenic liquid hydrogen PMD 70, it flows through tubes welded to or with high-conductivity connections to a high thermal conductivity shield 90, for instance through vapor cooled shields (VCSs) as shown, that surround both the cryogenic liquid hydrogen and cryogenic liquid oxygen tanks 10 and 20. The portion of removed cryogenic liquid hydrogen cools the cryogenic liquid hydrogen tank 20 first because it is much colder than the cryogenic liquid oxygen tank 10, and in series the portion of removed cryogenic liquid hydrogen cools the cryogenic liquid oxygen tank 10. After flowing though the cryogenic liquid oxygen tank VCS, the warmed hydrogen flows to a manifold that feeds a series of thrusters that operate on hydrogen only at step 508.

At step 508, the warmed portion of cryogenic liquid hydrogen may be utilized to power thrusters. The thrusters may include relatively simple non-burning gas thruster and/or resistojet type thrusters which adds electrically generated heat to improve thruster performance. Thus, the fluid vented through the PMD and TVS performs several functions including cryogenic liquid hydrogen tank pressure control via the PMD and TVS, additional cryogenic liquid hydrogen tank cooling via the VCS, cryogenic liquid oxygen tank cooling via the VCS, and supplemental thrust controls.

At step 510, it is determined if the MPS 50 is active. For example, if it is determined that the engine 200 is ignited, the engine may be powered at steps 512 to 516. If it is determined that the MPS 50 is inactive, it may be determined if one or more of the supercritical bottles of oxygen or hydrogen 30, 31, 40, and/or 41 are low at step 518.

At step 512, the engine 200 may be powered. During a firing of the main engine 200, cryogenic liquid oxygen and cryogenic liquid hydrogen feed the engine 200 under tank pressure. The engine 200 may include an expander type engine with a regeneratively cooled nozzle that is cooled by the cryogenic liquid hydrogen, for example. Supercritical hydrogen is autogenously generated by the engine 200 to provide some of the pressurization of the cryogenic liquid hydrogen tank. However, due to the aforementioned issues with condensation of the pressurant gases in low gravity, the pressure in the tank 20 may fall below a predetermined minimum.

At step 514, it may be determined if the pressure in cryogenic liquid hydrogen tank 20 is below a predetermined minimum. For example, a pressure sensor may sense the pressure in the tank 20 and the sensed pressure may be compared to a predetermined minimum. If it is determined that the sensed pressure is below a predetermined minimum, the pressure may be increased at step 516. If it is determined that the pressure is greater than or equal to the predetermined minimum value, it may be determined if the pressure in the cryogenic liquid tanks 10 and 20 is high at step 502.

At step 516, some additional gaseous hydrogen is made available from the supercritical hydrogen bottles to supplement the autogenous pressurization from the engine 200. For cryogenic liquid oxygen tank pressurization an oxygen heat exchanger may be included with the engine 200. If a shortfall occurs in the cryogenic liquid oxygen pressurization, gaseous oxygen from the supercritical oxygen bottles 30 and 31 provides additional pressurant mass as needed. To enhance the ability to create supercritical oxygen for pressurization the thermal switches 109, 110 are included from the oxygen supercritical bottles 30 and 31 directly to the engine heat source. This provides additional energy for supercritical oxygen generation that may replace or supplement the supercritical oxygen heat exchanger included with the engine 200. Furthermore, to aid in pressurization, the supercritical oxygen bottles 30 and 31 may be selectively thermally coupled to the warm structure 85 by a thermal switch for example.

At step 518, it may be determined if one or more of the supercritical bottles 30, 31, 40, and/or 41 are low. The supercritical oxygen bottles 30 and 31 and hydrogen bottles 40 and 41 provide gaseous oxygen and gaseous hydrogen for both RCS 60 and pressurization. In response to determining that one or more of the supercritical bottles 30, 31, 40, and/or 41 is nearly empty or below a predetermined minimum volume, it may be refilled. The bottles in each set are used sequentially. For example, the supercritical oxygen bottle 30 is utilized until low and then bottle 31 is utilized and vise versa. While one bottle of the set is being used, the other may be filled so that when the first bottle of a set is empty, the second bottle is full and ready for use. As shown for example in FIGS. 1A-1D, two bottles are included for each species where one bottle may be filled while the other is being used for RCS 60 and pressurization. As noted in FIGS. 1A-1D, adequate valves are included to operate this way.

At step 520, utilization of the one or more bottles determined to be low may be controlled to cease by closing the respective valves and utilization of the one or more bottles in the set are controlled to initiate by controlling the appropriate valves to open.

At step 522, the bottle(s) determined to be low are chilled down so that liquid propellant may be flowed into them without immediately boiling. To do this the thermal switch connecting the bottle to its associated cryogenic propellant tank is activated to flow heat out of the bottle and into the cryogenic propellant tanks. More particularly, each supercritical bottle 30, 31, 40, and 41 has a series of thermal switches 100-110 that allow heat to be moved in or out of the bottles 30, 31, 40, and 41. The supercritical bottles 30, 31, 40, and 41 are cooled via switches connected directly to the $LH_2$ tank 10. In this or other embodiments, the thermal switches may be utilized to transmit or transfer thermal energy between any suitable tank, bottle, device, or the like.

At step 524, pressure in the low bottle may be reduced. For example, once the supercritical bottles are adequately cooled, the bottle pressure is reduced either by RCS use or by venting through the RCS thrusters to a value lower than the propellant tanks.

At step 526, the low bottle may be filled. For example, the valves isolating the supercritical bottle from the cryogenic propellant tank are opened and liquid cryogen is flowed from the cryogenic liquid tank into the supercritical bottle. After a predetermined amount of liquid flows into the supercritical bottle, the bottle is isolated at both outlets.

At step 528, the newly filled bottle may be warmed. For example, the thermal switch from the cryogenic tank to the supercritical bottle is deactivated which then stops the external cooling of the supercritical bottle. Then the supercritical bottle is warmed to raise the bottle temperature and pressure to supercritical conditions. Warming is performed by several methods. First the thermal switches connecting the bottle to warm structure is activated. To warm the supercritical bottles 30, 31, 40, and 41, thermal switches 102, 103, 104, and 105 respectively may be employed that are coupled to the warm spacecraft structure 85. Some spacecraft components, such as avionics, are typically cooled and so the thermal switches 102, 103, 104, and 105 are closed so that they warm the supercritical bottles 30, 31, 40, and 41 and can potentially reduce avionics cooling requirements from other sources such as radiators.

Additional thermal switches 109 and 110 connect the supercritical bottles 30 and 31 to the main engine 200 in order to generate supplemental supercritical oxygen for cryogenic liquid oxygen tank 10 pressurization. The thermal switch 106 connects the cryogenic liquid oxygen tank 10 to the cryogenic liquid hydrogen tank 20 and provides additional cryogenic liquid oxygen tank cooling over and above what the VCS provides. Additional heat may be flowed into the supercritical oxygen and hydrogen bottles as needed by the switch connecting the supercritical oxygen bottles to the main engine, by the installed electric heaters, or by ambient heating from the space environment. Additional warming capability is included for each bottle 30, 31, 40, and 41 via electric heaters HT301, HT302, HT401, and HT402. Although it is not desired to use the heaters HT301, HT302, HT401, and HT402 since they consume power, they are included for an added margin and mission flexibility. Once the bottle is at the desired pressure and temperature all switches and heaters used for warming are deactivated and the supercritical bottle is ready for use at the proper conditions. Following warming, it may be determined if the pressure in cryogenic liquid tanks 10 and/or 20 is high at step 502.

At step 530, it may be determined if the pressure in the cryogenic liquid tanks 10 and 20 is less than a predetermined low-pressure value. During the course of the mission, contents of the cryogenic liquid tanks 10 and 20 may be utilized and/or the pressure may otherwise be reduced. The resulting pressure drop may be sensed and steps taken to increase the pressure to facilitate proper working conditions. For example, a pressure sensor in one or more of the cryogenic liquid tanks 10 and 20 may sense the pressure therein and this sensed pressure may be compared to the predetermined low-pressure or low-pressure values. The predetermined low pressure values may be based on one or more factors such as, for example, designed operational tank pressure, empirical data, manufacturer's recommendations, and the like. In response to the sensed pressure being at or below than the predetermined low-pressure value, the pressure may be increased at step 532.

In response to the sensed pressure being below the predetermined high-pressure value, the pressure may be increased in step 532 to bring the pressure in the cryogenic liquid tanks 10 and 20 within the range of the predetermined values mentioned above. This can quickly be accomplished by pressurizing the respective cryogenic liquid tanks 10 and 20 with gaseous forms of the respective species from the supercritical oxygen 30 and 31 or supercritical hydrogen 40 and 41 bottles.

The many features and advantages of various embodiments are apparent from the detailed specification, and thus, it is intended by the appended claims to cover all such features and advantages of any suitable embodiment which fall within the true spirit and scope of the various embodiments. Further, since numerous modifications and variations will readily occur to those skilled in the art, it is not desired to limit the embodiments to the exact construction and operation illustrated and described, and accordingly, all suitable modifications and equivalents may be resorted to, falling within the scope of the various embodiments.

What is claimed is:

1. A method of operating a propulsion system, comprising the steps of:
   determining pressure in a cryogenic liquid oxygen tank storing oxygen;
   cooling the cryogenic liquid oxygen tank by exchanging heat with a cryogenic liquid hydrogen tank via external cooling of a surface of the cryogenic liquid oxygen tank in response to determining that the pressure is greater than a predetermined value;
   pressurizing the cryogenic liquid oxygen tank via admission of a gaseous form of the oxygen in response to determining that the pressure is less than a predetermined value; and
   exchanging heat between a surface of the liquid hydrogen tank and a surface of a supercritical oxygen bottle.

2. The method of claim 1 further comprising the step of:
   powering a main propulsion system in response to determining that the pressure in the cryogenic liquid oxygen and hydrogen tanks is greater than the predetermined value.

3. The method of claim 1 further comprising the step of:
   transferring cryogenic liquid to a supercritical bottle to fill the supercritical bottle with cryogenic liquid in response to determining that a main propulsion system burn is being conducted.

4. The method of claim 3 further comprising the steps of:
   thermally coupling at least one of the cryogenic liquid oxygen and hydrogen tanks to a corresponding supercritical oxygen and hydrogen bottle; and
   regulating heat flow between the at least one cryogenic liquid oxygen and hydrogen tanks and the corresponding supercritical oxygen and hydrogen bottle in response to the exchanging heat therebetween.

5. The method of claim 4 further comprising the step of:
   activating a thermal switch coupling at least one of the cryogenic liquid oxygen and hydrogen tanks to the corresponding supercritical oxygen and hydrogen bottle to regulate heat flow therebetween.

6. The method of claim 1 further comprising the steps of:
   determining whether a main propulsion system burn is being conducted;
   determining a fill fraction of a supercritical bottle in response to determining that the main propulsion system burn is not being conducted; and
   filling the supercritical bottle in response to the fill fraction being below a predetermined fill fraction.

7. A method of operating a propulsion system, comprising the steps of:
   determining pressure in a cryogenic liquid oxygen tank storing oxygen;
   cooling the cryogenic liquid oxygen tank in response to determining that the pressure is greater than a predetermined value;
   pressurizing the cryogenic liquid oxygen tank via admission of a gaseous form of the oxygen in response to determining that the pressure is less than a predetermined value;
   determining whether a main propulsion system burn is being conducted;
   determining a fill fraction of a supercritical bottle in response to determining that the main propulsion system burn is not being conducted; and
   filling the supercritical bottle in response to the fill fraction being below a predetermined fill fraction by performing the following:
      cooling the supercritical bottle;
      reducing the pressure in the supercritical bottle in response to the cooling thereof;
      transferring cryogenic liquid to the supercritical bottle; and
      warming the supercritical bottle.

8. The method of claim 1 further comprising the step of:
   activating a thermal switch coupling the cryogenic liquid hydrogen tank to the cryogenic liquid oxygen tank to cool the cryogenic liquid oxygen tank.

9. The method of claim 1 further comprising the step of:
   cooling the supercritical oxygen bottle in response to exchanging heat between the surface of the cryogenic liquid hydrogen tank and the surface of the supercritical oxygen bottle.

10. The method of claim 9 further comprising the step of:
    activating a thermal switch coupling the cryogenic liquid hydrogen tank to the supercritical oxygen bottle to cool the supercritical oxygen bottle.

11. A method of regulating a fluid storage system, comprising the steps of:
    storing liquid hydrogen in a liquid hydrogen tank;
    exchanging heat between a surface of the liquid hydrogen tank and a surface of a supercritical oxygen bottle via external cooling of the supercritical oxygen bottle; and regulating heat flow between the liquid hydrogen tank and the supercritical oxygen bottle in response to exchanging heat therebetween.

12. The method of claim 11 further comprising the step of: activating a thermal switch coupling the liquid hydrogen tank to the supercritical oxygen bottle to regulate heat flow therebetween.

13. The method of claim 12 further comprising the steps of:
exchanging heat between the surface of the liquid hydrogen tank and a surface of a supercritical hydrogen bottle via external cooling of the supercritical hydrogen bottle; and
regulating heat flow between the liquid hydrogen tank and the supercritical hydrogen bottle in response to exchanging heat therebetween.

14. The method of claim 13 further comprising the step of: activating an additional one of the thermal switches coupling the liquid hydrogen tank to the supercritical hydrogen bottle for regulating heat flow therebetween.

15. The method of claim 13 further comprising the step of: storing liquid oxygen in a liquid oxygen tank;
thermally coupling the liquid hydrogen tank to the liquid oxygen tank; and
regulating heat flow between the liquid hydrogen tank and the liquid oxygen tank in response to the thermal coupling.

16. The method of claim 15 further comprising the step of: pressurizing at least one of the liquid hydrogen tank and liquid oxygen tank using a corresponding one of the supercritical oxygen bottle and supercritical hydrogen bottle.

17. The method of claim 15 further comprising the step of: feeding a main propulsion system with the liquid hydrogen and the liquid oxygen stored in corresponding ones of the liquid hydrogen tank and the liquid oxygen tank.

18. A method of operating a fluid storage system, comprising the steps of:
storing liquid hydrogen in a liquid hydrogen tank;
storing liquid oxygen in a liquid oxygen tank;
activating a plurality of thermal switches coupling the liquid hydrogen tank to each one of the liquid oxygen tank, a supercritical hydrogen bottle, and a supercritical oxygen bottle; and
exchanging heat between the liquid hydrogen tank and each one of the liquid oxygen tank, the supercritical hydrogen bottle, and the supercritical oxygen bottle via external cooling of a surface of the liquid oxygen tank, a surface of the supercritical hydrogen bottle, and a surface of the supercritical oxygen bottle in response to activating the thermal switches.

* * * * *